Sept. 9, 1924.
R. BARTELL
1,508,005
MULTIPLE GARMENT PRESSER
Filed Oct. 14, 1921
3 Sheets-Sheet 1
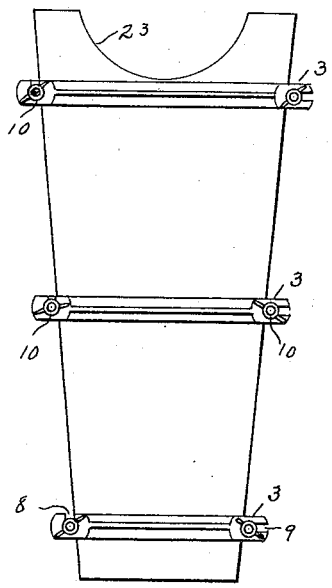
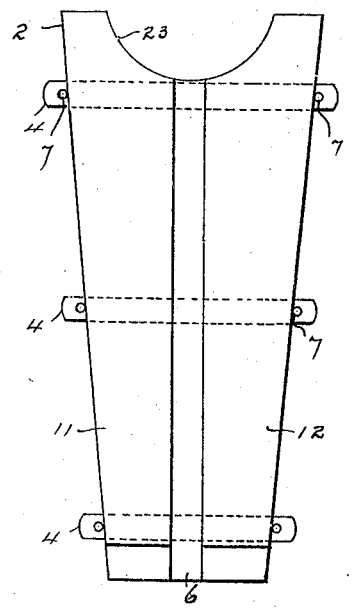
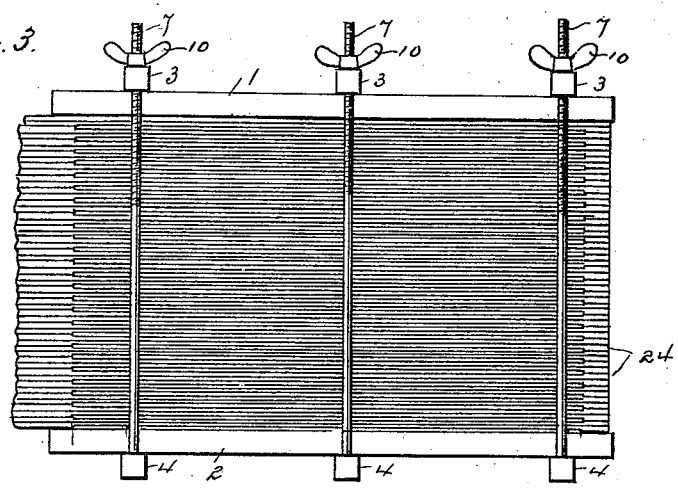
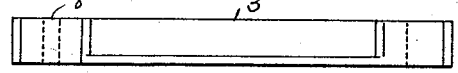
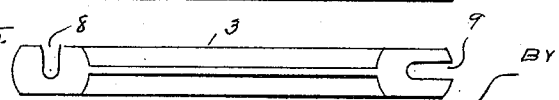
R. Bartell
INVENTOR
BY
Louis M. Sanders
ATTORNEY.

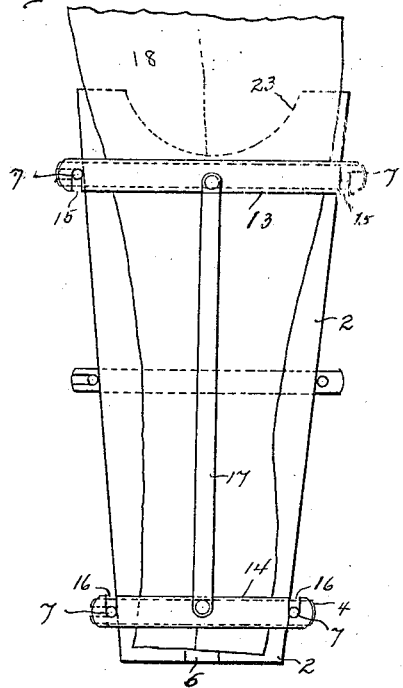
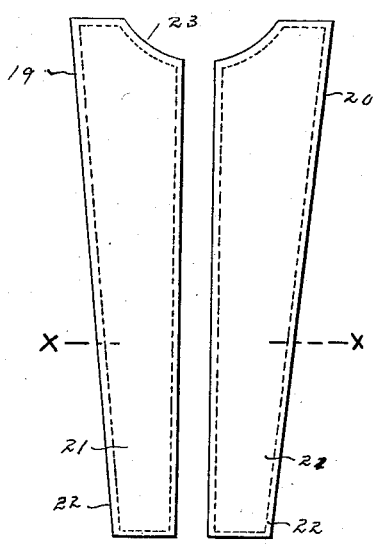
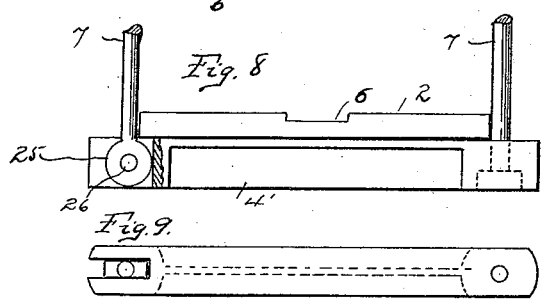
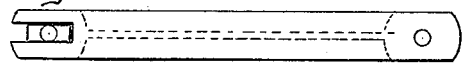
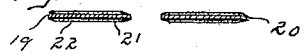
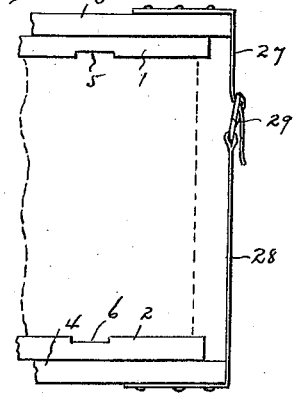
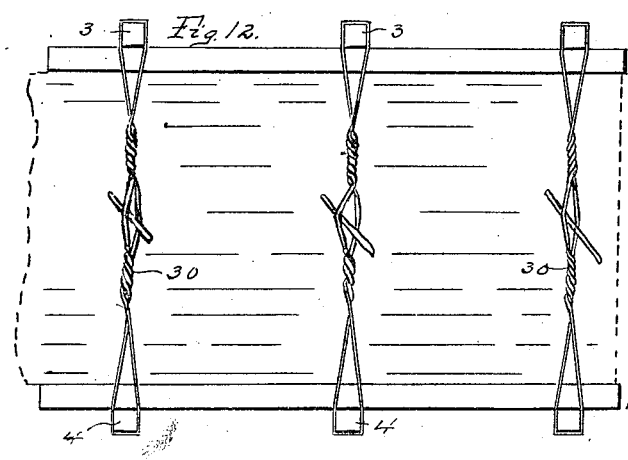

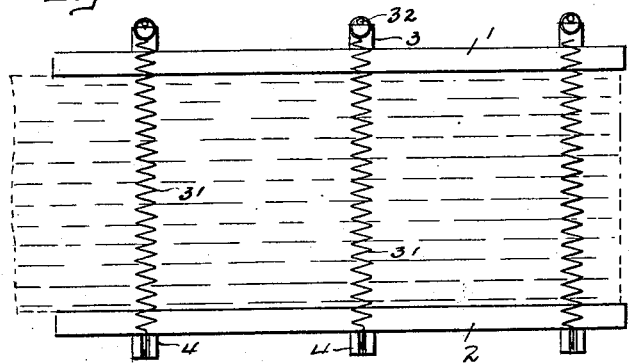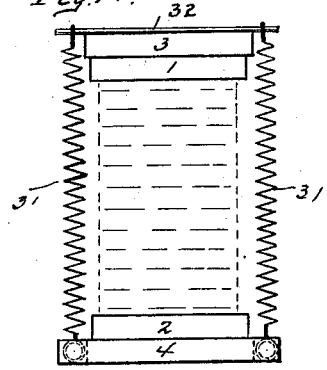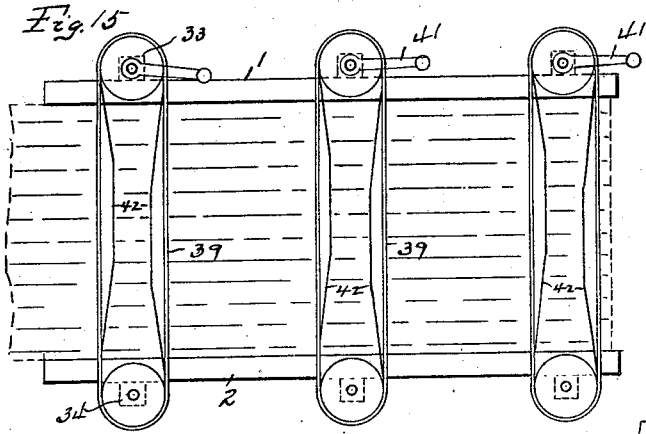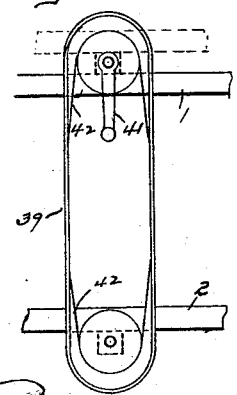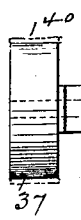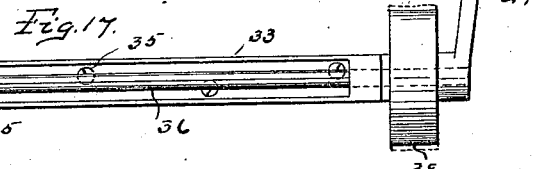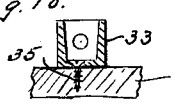

Patented Sept. 9, 1924.

1,508,005

UNITED STATES PATENT OFFICE.

REINHOLD BARTELL, OF NEWARK, NEW JERSEY.

MULTIPLE GARMENT PRESSER.

Application filed October 14, 1921. Serial No. 507,676.

*To all whom it may concern:*

Be it known that I, REINHOLD BARTELL, a citizen of the United States, residing in the city of Newark, county of Essex, and State of New Jersey, have invented a new and useful Improvement in Multiple Garment Pressers, of which the following is a specification.

In clothing factories it is now the general practice to press trousers singly by hand with a resulting output for each operative of from sixty to one-hundred pairs of trousers per day, and in many cases the work is but indifferently done, and is required to be done over in order that the garments may look presentable and be salable.

It is the purpose of my present invention to construct a presser in which a large number of pairs of trousers may be pressed at the same time with uniform excellent results. The presser comprises in general, a pair of heavy reinforced boards of the general shape of a pair of trousers' legs, and means for connecting and drawing said boards together with a number of pairs of trousers between them in such a manner as to obtain the desired fashionable creasing and shaping of each individual garment, with great reduction in the aggregate time and labor required to produce a given output, or what amounts to the same thing, to increase the out-put per operative manyfold.

In the accompanying drawings I have shown a series of modifications of the means for clamping the presser-boards together, but I wish it understood that any means for drawing the heavy presser-boards together and holding them in their adjusted positions would come within the scope of my invention.

Fig. 1 is a plan view of the top presser-board showing the clamping cleats in place.

Fig. 2 is a similar view of the bottom board, showing also a pair of supplemental or spacing boards thereon.

Fig. 3 is a side elevation of the complete presser showing a number of pairs of trousers in process of pressing.

Fig. 4 is a side view and Fig. 5 is a plan of one of the top clamping cleats.

Fig. 6 is plan of the bottom board with a pair of trousers placed thereon and the supplemental holding device for permitting the operative to properly shape the trousers' legs.

Fig. 7 is a plan of a pair of supplemental presser-boards.

Figs. 8 and 9 are side and plan views of a modified form of bottom cleat.

Fig. 10 is a cross-section on line X—X of Fig. 7.

Figs. 11–16 illustrate modifications of the means for drawing the top and bottom presser-boards together.

Fig. 17 is a plan and Fig. 18 is a cross-section of the clamping cleat shown in Fig. 15.

Similar reference numerals refer to like parts throughout the specification and drawing.

The presser comprises the top and bottom boards 1 and 2 of the general shape as shown, with top and bottom clamping cleats 3 and 4 and the adjustable connections between overlapping ends of corresponding cleats. The boards 1 and 2 have longitudinal grooves 5 and 6 as shown so as to permit the trousers' seams to register therein, in order not to interfere with the pressing.

The cleats 3 and 4 may be of wood or metal, and provided with convenient means for detachably connecting the clamping rods 7 as shown. The ends of the upper cleats are provided with open slots 8 and 9 to receive the upper ends of the rods 7 after which the wing nuts 10 may be screwed down upon the rods to draw the boards together. The trousers are carefully placed upon the lower board 2 and then drawn and stretched to proper shape, after which, the supplemental boards 11, 12 are placed in position, and then another pair of trousers placed thereon, and so on alternating the trousers with the boards 11, 12 until the pile reaches nearly to the tops of the rods 7. The board 1 is then placed on top of the pile, and the cleats 3 adjusted, and finally the wing nuts 10 are screwed down, to compress the entire pile of trousers. It may then be set aside for two or three hours, and upon opening up, the entire lot of trousers will be found to be neatly creased, shaped and pressed.

As a convenient device for holding the trousers in place while being stretched and shaped preparatory to pressing, I provide the holder shown in Fig. 6.

It consists of a pair of bars 13, 14 laterally notched as at 15, 16 to hook over the end rods 7, 7 as shown, with a strip of heavy elastic webbing 17, connecting the middle points of said bars. When adjusted upon a pair of trousers 18, as shown, the trousers' legs may be stretched, drawn and shaped beneath the holder, which serves to keep all parts in shape and place until the supplemental boards 11, 12 or 19, 20 are placed thereon. The holder bars 13, 14 may then be detached from the rods 7, 7 and slipped out from beneath the trousers just placed to be readjusted on top of the next pair of trousers. In this manner the entire pile is built up.

In ordinary practice, it is common to sponge or dampen the trousers' legs as the pile is being built up: When ordinary wooden boards 11, 12 are used to separate the trousers, this dampness will be absorbed by the boards, and they sometimes warp and get out of shape. To obviate this difficulty the boards 11, 12, may be made of any non-warping material, as specially prepared waterproof strawboard. In case wooden boards are used they may be provided with a layer of soft cloth or felt 21 on each side, and then the entire board covered with ordinary oil-cloth 22, as shown in Figs. 7 and 10. The provision of the pairs of boards 11, 12 and 19, 20 and separating them as shown in Figs. 2 and 7 is made necessary by reason of the extra thickness of cloth at the trousers' seams. The top and bottom boards 1 and 2, as well as the boards 11, 12 and 19, 20, are curved or rounded out at their wider ends as at 23, 23 so as to provide for the extra thickness at the crotches of the trousers, and yet extend up as far as practicable at the front and back. The boards 11, 12 or 19, 20, are placed upon the trousers' legs with the lower hems 24 of the legs extending beyond the ends of the boards as shown in Fig. 3.

In some cases, I may form the front set of rods 7 with eyes 25 at their lower ends, by which they are connected to the lower cleats 4' by the pins 26, so that said rods may be folded down out of the way while building up a pile of trousers. The rear rods 7 may be rigidly secured to the lower cleats as shown.

As heretofore indicated, any convenient means may be adopted for drawing the top bottom boards 1, 2 together, and I have shown several methods in addition to that shown in Figs. 1, 2 and 3.

In Fig. 11, the ends of the cleats 3, 4, are provided with leather straps 27, 28 connected by the buckle 29. In Fig. 12, the cleats 3, 4 have the wires 30, looped over their ends, and then twisted together at the middle. In Figs. 13, 14. heavy springs 31 are connected to the lower cleats 4 and stretched up and looped over the ends of rods 32 lying upon the upper sides of the cleats 3.

A very convenient and powerful means for drawing the upper and lower boards together to compress the interposed pile of trousers is shown in Figs. 15-18.

The boards 1, 2 have their cleats 33, 34 permanently secured thereto, by screws 35. Running longitudinally of each cleat is a shaft 36 upon the ends of which are the pulleys 37, 38 over corresponding pairs of which are the belts 39, 40. Cranks 41 are mounted upon the ends of the upper shafts, as shown so that upon turning the same, the belts are drawn over the pulleys. Each belt 39, 40 has upon its inner face two heavy layers 42 of leather having wedge shaped ends, and normally located between the pulleys as shown in Fig. 15. When the cranks 41 are turned these layers 42 run over the pulleys 37, 38, and thus draw the cleats closer together, as shown in Fig. 16, with the result of compressing the pile of trousers between the upper and lower boards 1, 2.

As heretofore stated, a large number of pairs of trousers may be piled into a presser, and the entire lot pressed at once, thus saving enormously in time and expense over the old method of pressing with a hot iron, one pair at a time by hand. One operative can handle three or four pressers successively and continuously unloading and loading up one presser while the others are doing their work and, then going to the next presser and so on, keeping all the pressers in progressing stages of operation.

I claim:—

1. In a garment presser, the combination of a presser board adapted to receive and support a plurality of garments thereon, cleats arranged at intervals upon the lower face of said board, upright rods connected to the extended ends of said cleats, and a garment holding device comprising a pair of bars each adapted to engage a pair of said rods, and an elastic connection between said bars to hold said device in place upon a garment to permit the same to be stretched and shaped preparatory to pressing.

2. In a garment presser, the combination of a presser board adapted to receive and support a plurality of garments thereon, cleats arranged at intervals upon the lower face of said board, rods connected to the ends of said cleats, a garment holding device comprising a pair of cross bars each adapted to engage a pair of said rods, an elastic connection between said bars to hold said device in place upon a garment, and a pair of supplemental separating boards adapted to be superposed upon said holding device and a garment therebeneath to retain said garment in place while said holding device is being withdrawn, and to separate said garment from another like garment to be superposed thereon.

REINHOLD BARTELL.